US012304237B2

(12) United States Patent
Albl et al.

(10) Patent No.: US 12,304,237 B2
(45) Date of Patent: May 20, 2025

(54) WHEEL BEARING UNIT FOR A MOTOR VEHICLE AND MOTOR VEHICLE

(71) Applicant: AUDI AG, Ingolstadt (DE)

(72) Inventors: Johannes Albl, Ingolstadt (DE); Michael Frisch, Schönberg (DE)

(73) Assignee: AUDI AG, Ingolstadt (DE)

( * ) Notice: Subject to any disclaimer, the term of this patent is extended or adjusted under 35 U.S.C. 154(b) by 121 days.

(21) Appl. No.: 18/362,104

(22) Filed: Jul. 31, 2023

(65) Prior Publication Data
US 2024/0066918 A1 Feb. 29, 2024

(30) Foreign Application Priority Data
Aug. 25, 2022 (DE) .......................... 102022121486.9

(51) Int. Cl.
*F16C 19/18* (2006.01)
*B60B 27/00* (2006.01)
*F16C 35/063* (2006.01)

(52) U.S. Cl.
CPC ........ B60B 27/001 (2013.01); B60B 27/0005 (2013.01); B60B 27/0026 (2013.01); B60B 27/0094 (2013.01); F16C 19/186 (2013.01); F16C 35/0635 (2013.01); F16C 2226/80 (2013.01); F16C 2326/02 (2013.01)

(58) Field of Classification Search
CPC ........................... F16C 19/186; F16C 35/0635; F16C 2226/80; F16C 2326/02; B60B 27/0005; B60B 27/001; B60B 27/0026; B60B 27/0094
See application file for complete search history.

(56) References Cited

U.S. PATENT DOCUMENTS 6,135,571 A * 10/2000 Mizukoshi ............ F16C 33/768
301/124.1
6,286,909 B1 9/2001 Mizukoshi et al.
7,118,182 B2 * 10/2006 Kayama .................. B60B 27/00
301/124.1
(Continued)

FOREIGN PATENT DOCUMENTS

DE 102004054907 A1 9/2006
DE 102017220457 A1 5/2019
(Continued)

OTHER PUBLICATIONS

Extended European Search Report issued on Feb. 1, 2024, in corresponding European Application No. 23185492.8, 14 pages.
(Continued)

*Primary Examiner* — Phillip A Johnson
(74) *Attorney, Agent, or Firm* — Maier & Maier, PLLC

(57) ABSTRACT

A wheel bearing unit for a motor vehicle, comprising a wheel hub, a wheel bearing housing and a rolling bearing by which the wheel hub is mounted rotatably in relation to the wheel bearing housing. The rolling bearing has at least one row of rolling elements which are guided on the wheel hub side in a bearing inner ring which is designed as a separate component in relation to the wheel hub and which is fixedly connected to the wheel hub. The wheel hub has a through opening with an inner toothing, via which through opening the wheel hub can be connected in a non-rotational manner to a drive journal which is provided with an external toothing.

13 Claims, 3 Drawing Sheets

(56) References Cited

U.S. PATENT DOCUMENTS

2021/0138834 A1 5/2021 Albl et al.

FOREIGN PATENT DOCUMENTS

| DE | 102020126843 A1 | 4/2022 |
| EP | 3135499 A1 | 3/2017 |
| JP | 2009234542 A | 10/2009 |
| KR | 1020150134131 A | 12/2015 |
| KR | 1020210033632 A | 3/2021 |

OTHER PUBLICATIONS

Search Report issued on Apr. 18, 2023, in corresponding German Application No. 102022121486.9, 8 pages.

* cited by examiner

WHEEL BEARING UNIT FOR A MOTOR VEHICLE AND MOTOR VEHICLE

FIELD

The invention relates to a wheel bearing unit for a motor vehicle, as well as to a motor vehicle.

BACKGROUND

DE 10 2004 054 907 A1, which represents the generic prior art, discloses a wheel bearing unit according to which a wheel hub having an inner toothing is rotatably mounted with respect to a wheel bearing housing via a rolling bearing. A row of rolling elements of the rolling bearing is guided in a bearing inner ring, which is designed as a separate component from the wheel hub and is firmly connected to it. A known problem is that in the region of the bearing inner ring, high notch stresses occur in the tooth base of the inner toothing, which can lead to toothing cracks in the inner toothing of the wheel hub and thus to premature destruction of the wheel hub and ultimately to failure of the wheel bearing unit.

SUMMARY

The object of the invention consists in further developing a wheel bearing unit in such a way that the occurrence of toothing cracks is avoided and thus an increased service life of the wheel bearing unit is ensured.

In a known manner, the wheel bearing unit comprises a wheel bearing housing, a rolling bearing and a wheel hub which has a through opening with an inner toothing, via which the wheel hub can be connected in a non-rotational manner to a drive journal, having external toothing, of a cardan shaft. The rolling bearing by means of which the wheel hub is rotatably mounted in relation to the wheel bearing housing comprises in a known manner at least one row of rolling elements which are guided on the wheel hub side in a bearing inner ring which is designed as a separate component in relation to the wheel hub and is firmly connected to the wheel hub.

According to the invention, the inner toothing now has a toothless portion which subdivides the inner toothing into a first toothing region and a second toothing region spaced apart therefrom in the axial direction a and which is positioned in such a way that the toothless portion lies radially opposite the bearing inner ring end face on the bearing inner side.

The toothless portion provided in accordance with the invention and its positioning radially opposite the end face on the bearing inner side of the rolling bearing has the effect of minimizing local notch stresses in the tooth root of the inner toothing. This means that it is now advantageously ensured that—since the notch stresses leading to tooth cracks are reduced—an increased service life of the wheel hub and thus of the wheel bearing unit is ensured.

To ensure simple, cost-effective manufacture, the toothless portion is preferably in the form of a turned-out region or undercut—introduced in the through opening of the wheel hub before gear broaching.

As initial tests have shown, the diameter $D_{Ab}$ of the toothless portion should preferably be selected so that the following applies:

$$1 \leq \frac{D_{Ab}}{D_F} \leq 1.2$$

wherein $D_F$ denotes the root diameter of the inner toothing or of the toothing portions of the inner toothing.

A further preferred embodiment is characterized in that the through opening of the wheel hub, in addition to the support region formed by the inner toothing, i.e. the first and first toothing portions as well as the toothless portion arranged between the two toothing portions, also comprises a fastening region having an abutment shoulder and an intermediate region which—viewed in the axial direction a—is arranged between the support region and the fastening region, and in that, relative to the root diameter $D_F$, the intermediate region has an intermediate region diameter $D_Z$ for which applies:

$$\frac{D_Z}{D_F} > 1$$

In addition to the weight saving achieved by the increased diameter, this also ensures in particular that during gear broaching the corresponding broaching tool only engages in the region of the support region, so that the load on the broaching tool is also significantly reduced. Preferably, the intermediate region diameter $D_Z$ is larger than the diameter $D_{Ab}$ of the toothless portion of the inner toothing or equal to the diameter $D_{Ab}$.

Preferably, the fastening region has a fastening region diameter D B for which, with respect to the root diameter $D_F$:

$$\frac{D_B}{D_F} > 1.2$$

This ensures that a sufficiently large abutment shoulder is provided.

A further preferred embodiment provides that—viewed in the axial direction a—the toothless portion has an axial portion length $L_{Ab}$ for which the following applies $$0.1 \leq \frac{L_{Ab}}{L_{In}} \leq 0.3$$

wherein $L_{In}$ denotes the axial length of the inner toothing.

Dimensioning according to the above requirement proves to be particularly advantageous, since, on the one hand, a sufficient length of the toothless portion is ensured for the intended reduction of the notch stress and, on the other hand, the upward limitation also ensures that the toothing portions have a sufficient toothing length for torque transmission.

In order to ensure the most compact possible design of the wheel bearing unit according to a further preferred embodiment it is provided that—viewed in the axial direction a—the intermediate region has an intermediate region length $L_Z$ for which, relative to the length $L_{In}$ of the inner toothing, the following applies:

$$0.5 \leq \frac{L_Z}{L_{In}} \leq 0.7$$

A further, advantageous embodiment of the wheel bearing unit is characterized in that—viewed in the axial direction a—the fastening region has a fastening region length $L_B$ for which, relative to the length $L_{In}$ of the inner toothing, the following applies:

$$0.3 \leq \frac{L_B}{L_{In}} \leq 0.6$$

In addition to a compact design, when considered in the axial direction a, this in particular also ensures that sufficient installation space is available for fastening means.

Another object of the invention is to further develop a motor vehicle comprising a wheel bearing unit in such a way that low-wear operation is ensured.

This object of the invention is achieved in that the wheel bearing unit is designed according to any one of claims 1 to 9.

All the explanations concerning the wheel bearing unit according to the invention can be applied analogously to the motor vehicle according to the invention, so that the advantages mentioned above are also achieved with the latter.

BRIEF DESCRIPTION OF THE FIGURES

Further advantages and possible applications of the invention result from the following description in conjunction with the exemplary embodiment shown in the drawing.

In the drawing.

DETAILED DESCRIPTION

Figure 1:
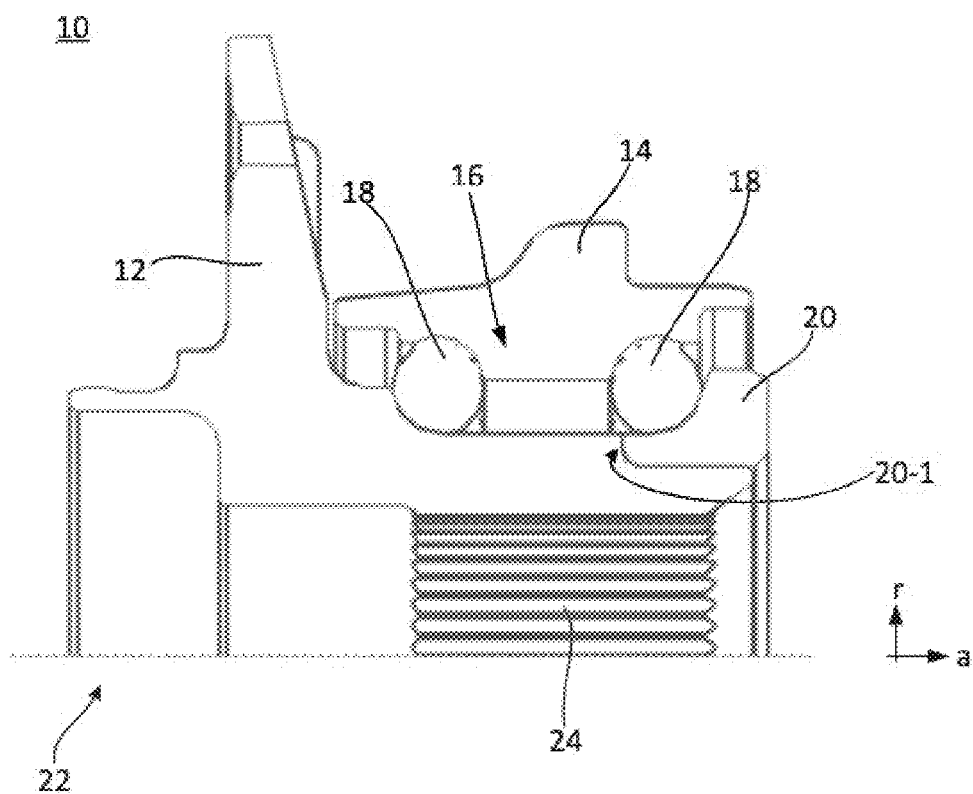
FIG. 1 shows a side view of a wheel bearing unit of a motor vehicle according to the prior art.

FIG. 1 shows a wheel bearing unit for a motor vehicle, indicated in its totality by the reference numeral 10. The wheel bearing unit 10 comprises a wheel hub 12, a wheel bearing housing 14 and a rolling bearing 16, via which the wheel hub 12 is rotatably mounted relative to the wheel bearing housing 14.

As can be further seen from FIG. 1, the rolling bearing 16 has two rows of rolling elements 18. While the left row of rolling elements 18—in FIG. 1—rolls in a bearing race formed in the wheel hub 12, the right row of rolling elements 18 is guided in a bearing inner ring 20 having a corresponding bearing race and which is firmly connected to the wheel hub 12.

The wheel hub 12 also has a through opening 22, which is provided in some regions with an inner toothing 24. Via the inner toothing 24, the wheel hub 12 can be non-rotatably connected in a known manner to a drive journal of a joint source—not shown here for reasons of clarity—which has external toothing corresponding to the inner toothing 24. In the following, the reference sign $D_Z$ denotes the root diameter of the inner toothing 24.

Figure 2:
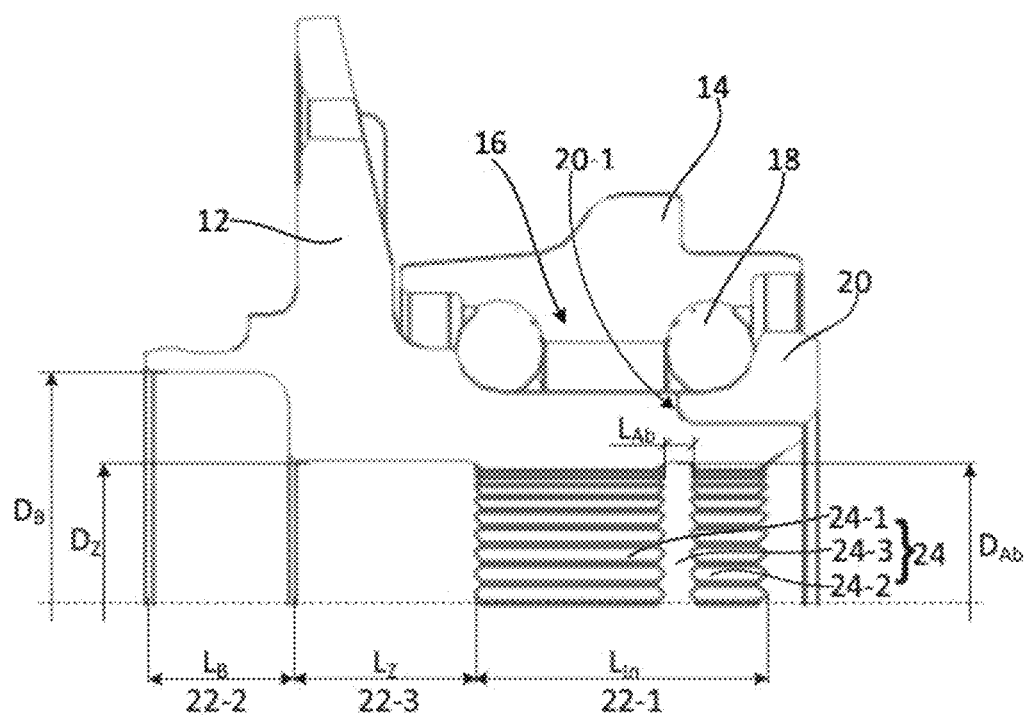
FIG. 2 shows a side view of a wheel bearing unit according to the invention.
Figure 3:
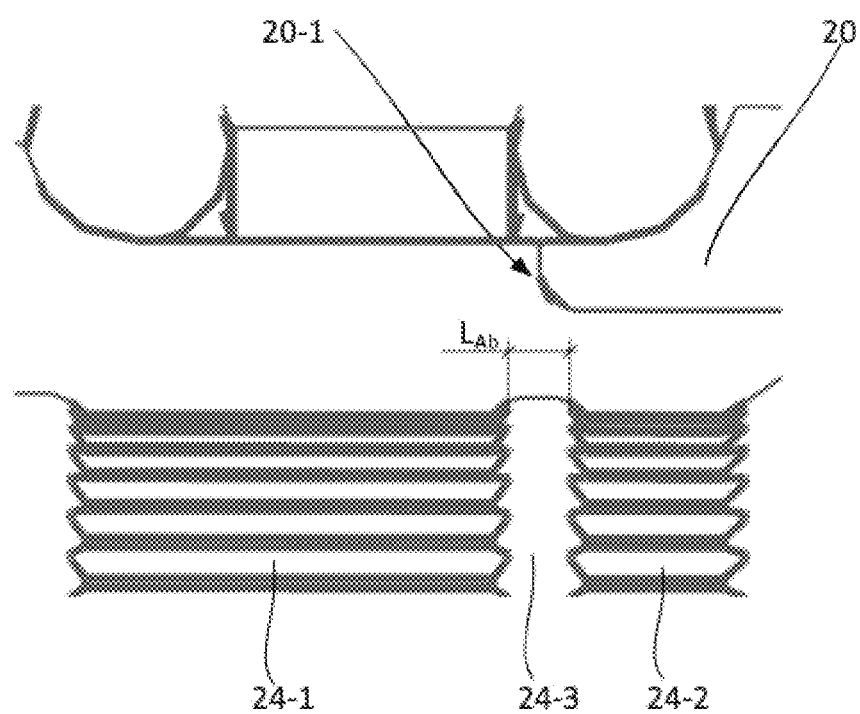
FIG. 3 shows an enlarged portion of FIG. 2.

A disadvantage of the prior art is that as a result of the local material taper of the wheel hub 12 caused by the bearing inner ring 20, in particular in the region of the transition to the end face 20-1 of the bearing inner ring 20 on the bearing inner side, high notch stresses occur in the tooth base of the inner toothing 24, which in turn can lead to toothing cracks in the inner toothing 24 and thus cause premature failure of the wheel hub 12 or the wheel bearing unit 10. This is where the invention comes in:

As FIG. 2 and FIG. 3 show, it is now provided that the inner toothing 24 has a first toothing portion 24-1, a second toothing portion 24-2 and a toothless portion 24-3, which, viewed in the axial direction a, lies between the two toothing portions 24-1, 24-2 and separates the two toothing portions 24-1, 24-2 from one other.

As can be further seen from FIG. 2 and in particular FIG. 3, the portions 24-1, 24-2, 24-3 forming the inner toothing 24 are arranged and dimensioned in such a way that, viewed in the axial direction a, the toothless portion 24-3 is positioned radially opposite the end face 20-1 of the bearing inner ring 20 on the bearing inner side.

Since the inner toothing 24 is now designed to be toothless in the critical portion of the wheel hub 12, i.e. in the region of the transition to the end face 20-1 of the bearing inner ring 20 on bearing inner side, it is ensured in an advantageous manner that the local notch stresses leading to toothing cracks are reduced, which has a positive effect on the service life of the wheel hub 12 and thus of the wheel bearing unit 10.

The toothless portion 24-3 is formed in the present case in the form of an undercut or turned region introduced into the through opening 22, and has a diameter $D_{Ab}$ which in the present case is 10% larger than the root diameter D F of the inner toothing 24.

Viewed in the axial direction a, the toothless portion 24-3 is dimensioned such that it has an axial length $L_{Ab}$, corresponding to 10% to 30% of the total length $L_{In}$ of the inner toothing 24, see FIG. 2 and FIG. 3.

As can be further seen from FIG. 2, the through opening 22 of the wheel hub 12 has, in addition to the region forming the inner toothing 24, hereinafter also referred to as the support region 22-1, a fastening region 22-2, as well as an intermediate region 22-3 arranged between the support region 22-1 and the fastening region 22-2—as viewed in the axial direction a—.

The reference sign $L_B$ denotes the axial length of the fastening region 22-2, and the reference sign $L_Z$ denotes the axial length of the intermediate region 22-3. Accordingly, the diameter of the fastening region 22-2 is denoted by D B and the diameter of the intermediate region 22-3 by $D_Z$, see FIG. 2.

In order to minimize the wear of the broaching tool during the manufacture of the inner toothing 24, the diameter of the intermediate region $D_Z$ is larger than the root diameter $D_F$ of the inner toothing 24. In addition to the lower wear, the increase in diameter also advantageously results in a weight saving. In the present case, the diameter $D_Z$ is selected so that it corresponds to the diameter $D_{Ab}$ of the toothless portion 24-3, i.e.

$$D_Z = D_{Ab} = 1.1 * D^F$$

Thus, the regions 24-3 and 24-2 can advantageously be manufactured in one working step. The fastening region 22-2 is dimensioned in such a way that the fastening diameter $D_B$ is larger than the root diameter $D_F$ by a factor of 1.2. This ensures that a sufficiently large fastening shoulder 26 is available for the fastening means, such as a nut or bolt, via which the wheel hub 12 is connected to the drive journal of a joint source, see FIG. 2.

To ensure a compact design of the wheel bearing unit 10, the axial lengths $L_B$ and $L_Z$ of regions 22-2 and 22-3 are presently dimensioned such that the axial length $L_B$ of the fastening region 22-2 corresponds to about 30% to 60% of the total length $L_{In}$ of the inner toothing 24 and the axial length $L_Z$ of the intermediate region 22-3 corresponds to about 50% to 70% of the total length $L_{In}$ of the inner toothing 24.

The invention claimed is:

1. A wheel bearing unit for a motor vehicle, comprising a wheel hub, a wheel bearing housing and a rolling bearing by means of which the wheel hub is mounted rotatably in relation to the wheel bearing housing, wherein the rolling bearing has at least one row of rolling elements which are guided on the wheel hub side in a bearing inner ring which is designed as a separate component in relation to the wheel hub and which is fixedly connected to the wheel hub, wherein the wheel hub has a through opening with an inner toothing, via which through opening the wheel hub is connected in a non-rotational manner to a drive journal which is provided with an external toothing,
wherein the inner toothing is formed comprising a first toothing portion, a second toothing portion and a toothless portion which, when viewed in the axial direction, lies between the first and second toothing portions and separates the first and second toothing portions from one another, wherein the toothless portion of the inner toothing, when viewed in the axial direction, is arranged in such a way that the toothless portion is positioned radially opposite the end face of the bearing inner ring on the bearing inner side.

2. A wheel bearing unit according to claim 1, wherein relative to a root diameter of the first and second toothing portions of the inner toothing, the toothless portion of the inner toothing has a diameter for which the following applies:

$$1 \leq \frac{\text{diameter } (D_{Ab}) \text{ of the toothless portion}}{\text{root diameter } (D_F)} \leq 1,2.$$

3. The wheel bearing unit according to claim 2, wherein the intermediate region diameter is greater than or equal to the diameter of the toothless portion of the inner toothing.

4. The wheel bearing unit according to claim 2, wherein relative to the root diameter, the fastening region has a fastening region diameter for which the following applies:

$$\frac{\text{fastening region diameter } (D_B)}{\text{root diameter } (D_F)} \geq 1,2$$

5. The wheel bearing unit according to claim 2 characterized in that the toothless portion of the inner toothing is formed like an undercut.

6. The wheel bearing unit according to claim 2, wherein the through opening of the wheel hub comprises a support region having the inner toothing, a fastening region having a bearing shoulder, and an intermediate region arranged between the support and fastening regions, when viewed in the axial direction, and, relative to the root diameter, the intermediate region has an intermediate region diameter for which the following applies:

$$\frac{\text{intermediate region diameter } (D_Z)}{\text{root diameter } (D_F)} > 1$$

7. The wheel bearing unit according to claim 1, wherein the through opening of the wheel hub comprises a support region having the inner toothing, a fastening region having a bearing shoulder, and an intermediate region arranged between the support and fastening regions, when viewed in the axial direction, and, relative to the root diameter, the intermediate region has an intermediate region diameter for which the following applies:

$$\frac{\text{intermediate region diameter } (D_Z)}{\text{root diameter } (D_F)} > 1$$

8. The wheel bearing unit according to claim 7, wherein when viewed in the axial direction, the inner toothing has a length, and in that relative to the length of the inner toothing, the intermediate region has an axial intermediate region length for which the following applies:

$$0.5 \leq \frac{\text{intermediate region length } (L_Z)}{\text{length of inner toothing } (L_{In})} \leq 0.7$$

9. The wheel bearing unit according to claim 7, wherein when viewed in the axial direction, the inner toothing has a length, and in that, relative to the length of the inner toothing, the fastening region has an axial fastening region length for which the following applies:

$$0.3 \leq \frac{\text{intermediate region length } (L_B)}{\text{length of inner toothing } (L_{In})} \leq 0.6$$

10. The wheel bearing unit according to claim 7, wherein the intermediate region diameter ($D_Z$) is greater than or equal to the diameter of the toothless portion of the inner toothing.

11. The wheel bearing unit according to claim 7, wherein relative to the root diameter, the fastening region has a fastening region diameter for which the following applies:

$$\frac{\text{fastening region diameter } (D_B)}{\text{root diameter } (D_F)} \geq 1,2$$

12. The wheel bearing unit according to claim 1, wherein when viewed in the axial direction, the inner toothing has a length, and in that, relative to the length of the inner toothing, the toothless portion has an axial portion length for which the following applies:

$$0.1 \leq \frac{\text{portion length } (L_{Ab})}{\text{length of inner toothing } (L_{In})} \leq 0.3$$

13. A motor vehicle, comprising a wheel bearing unit, the wheel bearing unit is formed according to claim 1.

* * * * *